US010103553B2

(12) United States Patent
Park

(10) Patent No.: US 10,103,553 B2
(45) Date of Patent: Oct. 16, 2018

(54) WIRELESS POWER TRANSMITTER AND RECEIVER

(71) Applicant: LG ELECTRONICS INC., Seoul (KR)

(72) Inventor: Yongcheol Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 14/887,087

(22) Filed: Oct. 19, 2015

(65) Prior Publication Data

US 2016/0118810 A1 Apr. 28, 2016

Related U.S. Application Data

(60) Provisional application No. 62/067,213, filed on Oct. 22, 2014.

(51) Int. Cl.
| | |
|---|---|
| *H02J 50/12* | (2016.01) |
| *H02J 50/80* | (2016.01) |
| *H02J 5/00* | (2016.01) |
| *H02J 7/02* | (2016.01) |
| *H02J 7/00* | (2006.01) |
| *H04B 5/00* | (2006.01) |

(52) U.S. Cl.
CPC ............ *H02J 5/005* (2013.01); *H02J 7/0013* (2013.01); *H02J 7/025* (2013.01); *H02J 50/12* (2016.02); *H02J 50/80* (2016.02); *H04B 5/0037* (2013.01); *H04B 5/0087* (2013.01)

(58) Field of Classification Search
None
See application file for complete search history.

(56) References Cited

U.S. PATENT DOCUMENTS

| | | | |
|---|---|---|---|
| 2012/0306284 A1* | 12/2012 | Lee ................. | H02J 17/00 307/104 |
| 2014/0191568 A1* | 7/2014 | Partovi ............ | H02J 7/025 307/9.1 |
| 2016/0036498 A1* | 2/2016 | Chu ................ | H04B 5/0037 455/41.1 |
| 2017/0170686 A1* | 6/2017 | Van Wageningen .... | H02J 50/10 |

\* cited by examiner

*Primary Examiner* — Jared Fureman
*Assistant Examiner* — Joel Barnett
(74) *Attorney, Agent, or Firm* — Birch, Stewart, Kolasch & Birch, LLP

(57) ABSTRACT

Disclosed is a method of wirelessly transmitting, the method including: a selection phase for detecting each of power receivers and sending a digital ping to the each of power receivers; an introduction phase for receiving a request from the each of power receivers for a free slot; a configuration phase for providing a series of locked slots to the each of power receivers; a negotiation phase for receiving at least one negotiation data packet from the each of power receivers using the series of locked slots; a power transfer phase for transmitting power to the each of power receivers; and a renegotiation phase for returning to the negotiation phase, wherein the renegotiation phase is a phase for returning to the negotiation phase when a change of a charge status of at least one of the each of power receivers to which the power is transmitted is detected.

18 Claims, 13 Drawing Sheets

FIG. 6

| Preamble | ZERO | Response | Type | Info | Parity |

Type
ZERO: slot sync
ONE : frame sync

Parity: odd

Response
'00': no comms
'01': comms error
'10': NAK
'11': ACK

Info(Type is ZERO)
'00': allocated
'01': locked
'10': free
'11': reserved

Info(Type is ONE)
'00': slotted
'01': free format
'10': reserved
'11': reserved

FIG. 12

|    | b7 | b6 | b5 | b4 | b3 | b2 | b1 | b0 |
|----|----|----|----|----|----|----|----|----|
| B0 | Renegotiation (0×09) | | | | Slot number (0×01...0×09) | | | |

\<EPT packet\>

|    | b7 | b6 | b5 | b4 | b3 | b2 | b1 | b0 |
|----|----|----|----|----|----|----|----|----|
| B0 | 0×01 (Requst Guaranteed Power) | | | | | | | |
| B1 | Power class & level | | | | | | | |

(b)

|    | b7 | b6 | b5 | b4 | b3 | b2 | b1 | b0 |
|----|----|----|----|----|----|----|----|----|
| B0 | Guaranteed Power class | | Guaranteed Power | | | | | |

WIRELESS POWER TRANSMITTER AND RECEIVER

CROSS-REFERENCE TO RELATED APPLICATION

Pursuant to 35 U.S.C. § 119(a), this application claims the benefit of earlier filing date and right of priority to U.S. Provisional Application No. 62/067,213, filed on Oct. 22, 2014, the contents of which are incorporated by reference herein in their entirety.

BACKGROUND OF THE INVENTION

Field of the Invention

The present invention relates to a wireless power transmitter and receiver and a method of controlling the same.

Discussion of the Related Art

A contactless wireless charging method is an energy transfer method for electromagnetically transferring energy without using a wire in a method for sending energy through an existing wire so that the energy is used as power for an electronic device. The contactless wireless transmission method includes an electromagnetic induction method and a resonant method. In the electromagnetic induction method, a power transmission unit generates a magnetic field through a power transmission coil (i.e., a primary coil), and a power reception coil (i.e., a secondary coil) is placed at the location where an electric current may be induced so that power is transferred. In the resonant method, energy is transmitted using a resonant phenomenon between the transmission coil and the reception coil. In this case, a system is configured so that the primary coil and the secondary coil have the same resonant frequency, and resonant mode energy coupling between the transmission and reception coils is used.

SUMMARY OF THE INVENTION

The present invention proposes an operation of a power transmitter configured to flexibly control the amount of power transmitted to each power receiver depending on a change in the number of power receivers that are being charged.

In accordance with an embodiment of the present invention, a method of wireless power transferring, by a power transmitter transmitting power to a plurality of power receivers, the method including: a selection phase for detecting each of power receivers and sending a digital ping to the each of power receivers; an introduction phase for receiving a request from the each of power receivers for a free slot through which the each of power receivers sends a control information (CI) packet; a configuration phase for providing a series of locked slots to the each of power receivers; a negotiation phase for receiving at least one negotiation data packet from the each of power receivers using the series of locked slots; a power transfer phase for transmitting power to the each of power receivers; and a renegotiation phase for returning to the negotiation phase, wherein the renegotiation phase is a phase for returning to the negotiation phase when a change of a charge status of at least one of the each of power receivers to which the power is transmitted is detected.

Furthermore, a case where the change of the charge status of the at least one power receiver is detected may include: a case where a charge completion of the at least one power receiver is detected, or a case where a deviation of the at least one power receiver from a charging area is detected.

Furthermore, the renegotiation phase includes detecting the change of the charge status by receiving an end power transfer (EPT) packet from the at least one power receiver.

Furthermore, the EPT packet may include: information on a slot number allocated to the at least one power receiver, and EPT code information indicating a charge completion of the at least one power receiver.

Furthermore, the renegotiation phase may include a phase for detecting the change of the charge status when a CI packet is not consecutively received from the at least one power receiver.

Furthermore, when the change of the charge status of the at least one power receiver is detected, the renegotiation phase may include a phase for notifying remaining power receivers of the plurality of power receivers other than the at least one power receiver of a return to the negotiation phase.

Furthermore, the phase for notifying the remaining power receivers of the return to the negotiation phase may include sending a sync pattern including renegotiation information indicating the return to the negotiation phase to the remaining receivers.

Furthermore, the renegotiation information may be included in an Info field of the sync pattern.

Furthermore, the method may further include a phase for receiving an EPT packet from the remaining power receivers as a response to the sync pattern.

Furthermore, the EPT packet may include: information on slot numbers allocated to the remaining power receivers, and EPT code indicating the return to the negotiation phase.

In accordance with another embodiment of the present invention, there is provided a power transmitter transmitting power to a plurality of power receivers, including: a coil assembly configured to include at least one primary coil for generating a magnetic field; an inverter configured to convert a DC (Direct Current) signal into an AC (Alternating Current) signal; a tank circuit configured to provide impedance matching between the inverter and the at least one primary coil; a communication unit configured to perform communication with a power receiver; and a control unit configured to control power transfer, wherein the power transmitter may be configured to: detect each of power receivers and send a digital ping to the detected each of the power receivers, receive a request for a free slot which is used for the each of the power receivers to send a control information (CI) packet, provide a series of locked slots to the each of the power receivers, receive at least one negotiation data packet from the each of the power receivers using the series of locked slots, and transmit power to each of the power receivers, and wherein the power transmitter returns to the negotiation phase when a change of a charge status of at least one of the plurality of power receivers to which the power is transmitted is detected.

Furthermore, a case where the change of the charge status of the at least one power receiver is detected may include: a case where a charge completion of the at least one power receiver is detected, or a case where a deviation of the at least one power receiver from a charging area is detected.

Furthermore, the power transmitter may be further configured to detect the change of the charge status by receiving an end power transfer (EPT) packet from the at least one power receiver.

Furthermore, wherein the EPT packet may include: information on a slot number allocated to the at least one power receiver, and EPT code information indicating a charge completion of the at least one power receiver.

Furthermore, the power transmitter may be further configured to detect the change of the charge status when a CI packet is not consecutively received from the at least one power receiver.

Furthermore, when the change of the charge status of the at least one power receiver is detected, the power transmitter may be further configured to notify remaining power receivers of the plurality of power receivers other than the at least one power receiver of a return to the negotiation phase.

Furthermore, the power transmitter further configured to send a sync pattern including renegotiation information indicating the return to the negotiation phase to the remaining receivers.

Furthermore, the renegotiation information may be included in an Info field of the sync pattern.

Furthermore, the power transmitter is further configured to receive an EPT packet from the remaining power receivers as a response to the sync pattern.

Furthermore, the EPT packet may include: information on slot numbers allocated to the remaining power receivers, and EPT code indicating the return to the negotiation phase.

BRIEF DESCRIPTION OF THE DRAWINGS

FIG. 6 is a diagram showing the format of a sync pattern in accordance with an embodiment of the present invention.

FIG. 12 is a diagram showing an EPT packet in accordance with an embodiment of the present invention.

FIG. 13 is a diagram showing the format of an SRQ packet in accordance with an embodiment of the present invention.

DETAILED DESCRIPTION OF THE EMBODIMENTS

Figure 1:
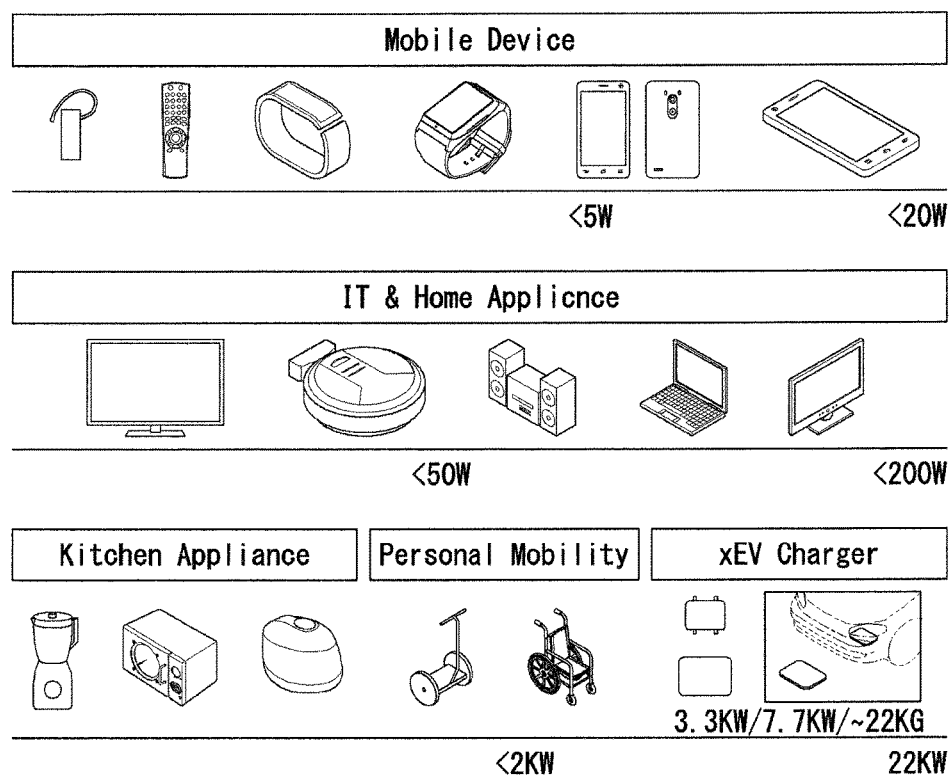
FIG. 1 shows that electronic devices are classified depending on the number of power that is transmitted and received in a wireless charging system.

Terms used in this specification are common terms which are now widely used by taking into consideration functions in this specification, but the terms may be changed depending on an intention of those skilled in the art, a use practice, or the appearance of a new technology. Furthermore, in a specific case, some terms have been randomly selected by the applicant. In this case, the meaning of a corresponding term is described in a corresponding part of a corresponding embodiment. Accordingly, the terms used in this specification should not be understood simply based on their names, but should be understood based on their substantial meanings and contents over this specification.

Furthermore, although embodiments of the present invention are described in detail with reference to the accompanying drawings and contents described in the drawings, the present invention is not limited to or restricted by the embodiments.

Hereinafter, some embodiments of the present invention are described in detail with reference to the accompanying drawings.

For the standardization of wireless power transmitter/receivers, Wireless Power Consortium (WPC) standardizes technologies related to wireless power transmission/reception.

A recently developed wireless charging system may support the transmission/reception of low power of about 5 W. In this case, there is a problem in that a charging time is long and efficiency is low in such a low power charging method because the size of a mobile device and the capacity of a battery are recently increased. Accordingly, a wireless charging system supporting the transmission/reception of middle power of about 15 W~20 W is developed. Furthermore, in order to improve charging efficiency, a wireless charging system to which a resonant method for simultaneously charging a plurality of electronic devices has been added is developed.

An embodiment of the present invention relates to a wireless charging system to which the resonant method has been added and proposes a wireless charging transmitter/receiver using the resonant method, which is compatible with a wireless charging transmitter/receiver using an electromagnetic induction method supporting low power/middle power.

A wireless power transmitter and wireless power receiver of a resonant type proposed by an embodiment of the present invention and a wireless charging method and a communication protocol using the wireless power transmitter and wireless power receiver are described below. Furthermore, hereinafter, resonant mode (or a resonant type) may also be called shared mode (or a shared type). Furthermore, a wireless power transmitter may be abbreviated as a power transmitter or a transmitter, and a wireless power receiver may be abbreviated as a power receiver or a receiver.

FIG. 1 shows an embodiment of various electronic devices into which a wireless charging system is introduced.

FIG. 1 shows that electronic devices are classified depending on an amount of power that is transmitted and received in a wireless charging system.

Referring to FIG. 1, a small power (about 5 W or less or about 20 W or less) wireless charging method may be applied to wearable devices, such as a smart watch, smart glass, a head mounted display (HMD), and a smart ring, and mobile electronic devices (or portable electronic devices), such as an earphone, a remote controller, a smart phone, a PDA, and a tablet PC. A middle power (about 50 W or less or about 200 W or less) wireless charging method may be applied to middle/small-sized home appliances, such as a notebook computer, a robot clearer, TV, audio equipment, and a monitor. A large power (about 2 kW or less or 22 kW or less) wireless charging method may be applied to kitchen equipment, such as a mixer, a microwave, and an electric rice cooker, and personal mobile devices (or electronic devices/mobile means), such as a wheel chair, an electric kickboard, an electric bicycle, and an electric vehicle.

Each of the aforementioned electronic devices/mobile means (or shown in FIG. 1) may include a wireless power receiver to be described later. Accordingly, the aforementioned electronic devices/mobile means may be wirelessly charged with power received from a wireless power transmitter.

Hereinafter, a mobile device to which the small wireless charging method is applied is chiefly described for convenience of description, but this is only an embodiment. A wireless charging method in accordance with an embodiment of the present invention may be applied to the aforementioned various electronic devices.

Figure 2:
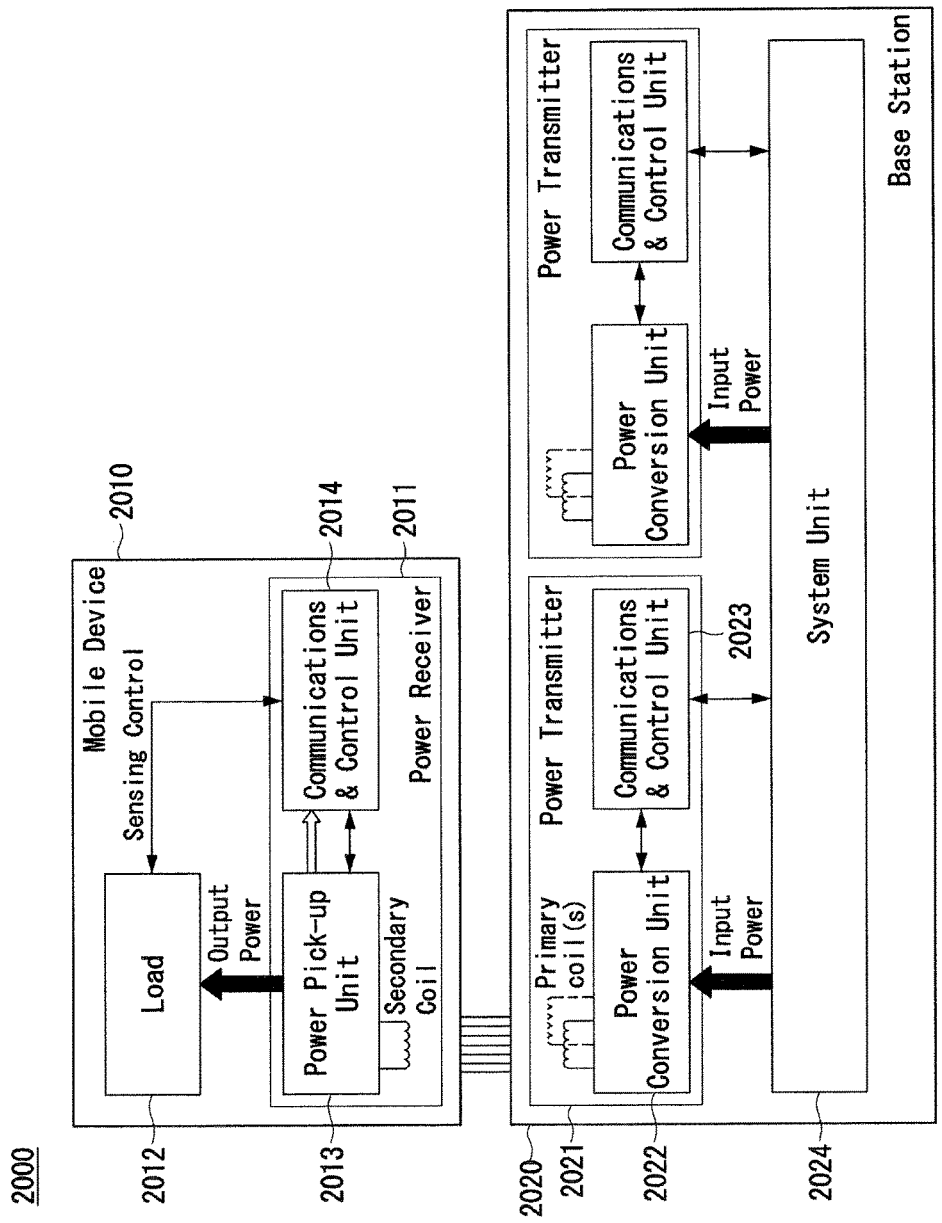
FIG. 2 is a block diagram of a wireless power transmission/reception system in accordance with an embodiment of the present invention.

FIG. 2 is a block diagram of a wireless power transmission/reception system in accordance with an embodiment of the present invention.

Referring to FIG. 2, a wireless power transmission/reception system 2000 includes a mobile device 2010 configured to wirelessly receive power and a base station 2020 configured to wirelessly transfer (or transmit) power. Hereinafter, the mobile device may also be called a "power receiver product", and the base station may also be called a "power transmitter product."

The mobile device 2010 includes a power receiver 2011 for wirelessly receiving power through a secondary coil and a load 2012 for receiving power received by the power receiver 2011, storing the received power, and supplying the stored power to a device.

The power receiver 2011 may include a power pick-up unit 2013 and a communications & control unit 2014. The power pick-up unit 2013 may receive a wireless power signal through the secondary coil and convert the received signal into electric energy. The communications & control unit 2014 may control the transmission/reception of a power signal (or power).

The base station 2020 is a device for providing inductive power or resonant power, and may include at least one power transmitter 2021 or a system unit 2024.

The power transmitter 2021 may send inductive power or resonant power and control such transmission. The power transmitter 2021 may include a power conversion unit 2022 configured to convert electric energy into a power signal by generating a magnetic field through a primary coil(s) and a communications & control unit 2023 configured to control communication and power transfer with the power receiver 2011 so that power of a proper level is transferred. The system unit 2024 may perform control of other operations of the base station 2020, such as input power provisioning, control of a plurality of power transmitters, and control of a user interface.

The power transmitter 2021 may control transmission power by controlling an operating point. The controlled operating point may correspond to a combination of a frequency (or phase), a duty cycle, a duty ratio, and voltage amplitude. The power transmitter 2021 may control transmission power by controlling at least one of a frequency (or phase), a duty cycle, a duty ratio, or voltage amplitude.

Furthermore, the power transmitter 2021 may supply constant power, and the power receiver 2011 may control reception power by controlling a resonant frequency.

Hereinafter, a coil or a coil unit may also be called a coil assembly, a coil cell, or a cell which includes a coil and at least one element close to the coil.

Figure 3:
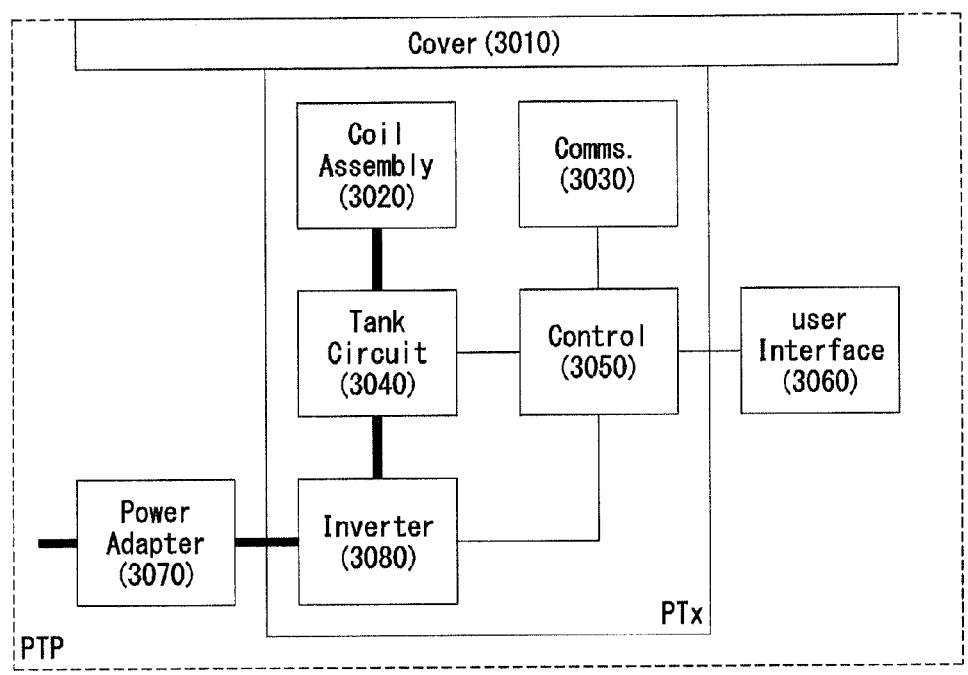
FIG. 3 is a block diagram of a power transmitter product in accordance with an embodiment of the present invention.

FIG. 3 is a block diagram of the power transmitter product in accordance with an embodiment of the present invention.

Referring to FIG. 3, the power transmitter product PTP may include at least one of a cover configured to cover a coil assembly 3020, a power adapter 3070 configured to supply power to a power transmitter PTx, the power transmitter PTx configured to send (or transmit) wireless power, or a user interface 3060 configured to provide information related to the progress of power transfer and other related information. In particular, the user interface 3060 may be optionally included in the power transmitter product PTP or may be included as another user interface of the power transmitter product PTP.

The power transmitter PTx may include at least one of the coil assembly 3020, a tank circuit (or impedance matching circuit) 3040, an inverter 3080, a communication unit 3030, or a control unit 3050.

The coil assembly 3020 may include at least one primary coil for generating a magnetic field.

The tank circuit 3040 may provide impedance matching between the inverter 3080 and the primary coil(s). The tank circuit 3040 may generate resonance in a frequency suitable for boosting the current of the primary coil. In a multi-coil PTx, the tank circuit 3040 may further include a multiplexer for routing a signal from the inverter 3080 to a subset of the primary coils. The tank circuit 3040 may also be called an impedance matching circuit.

The inverter 3080 may change DC input into an AC signal. The inverter 3080 may be driven as a half-bridge or a full-bridge so that it generates a pulse wave of an adjustable frequency and a duty cycle. Furthermore, the inverter 3080 may include a plurality of stages for controlling an input voltage level.

The communication unit 3030 may perform communication with a power receiver. The power receiver performs load modulation in order to communicate a request and information for the power transmitter PTx. Accordingly, the power transmitter PTx may monitor the amplitude and/or phase of the current and/or voltage of the primary coil in order to demodulate data transmitted by a power receiver using the communication unit 3030. Furthermore, the power transmitter PTx may control output power so that data is transmitted through the communication unit 3030 using a frequency shift keying (FSK) method. To this end, the power transmitter PTx may further include a current sensor. In this case, the power transmitter PTx may discover a power receiver by detecting a change in the current of the primary coil and detect data transmitted by the discovered power receiver.

The control unit 3050 may control the communication and power transfer of the power transmitter PTx. The control unit 3050 may control power transfer by controlling the aforementioned operating point. The operating point may correspond to at least one of an operating frequency, a duty cycle, a duty ratio, or an input voltage, for example.

The elements of the power transmitter product PTP may be provided as separate units/elements/chipsets or may be provided as a single unit/element/chipset as shown in FIG. 1. For example, the communication unit and the control unit may be provided as separate elements/chipsets or may be provided as a single element/chipset as shown in FIG. 1. Furthermore, the elements of the power transmitter product PTP may be optionally included, or a new element(s) may be added to the power transmitter product PTP.

Figure 4:
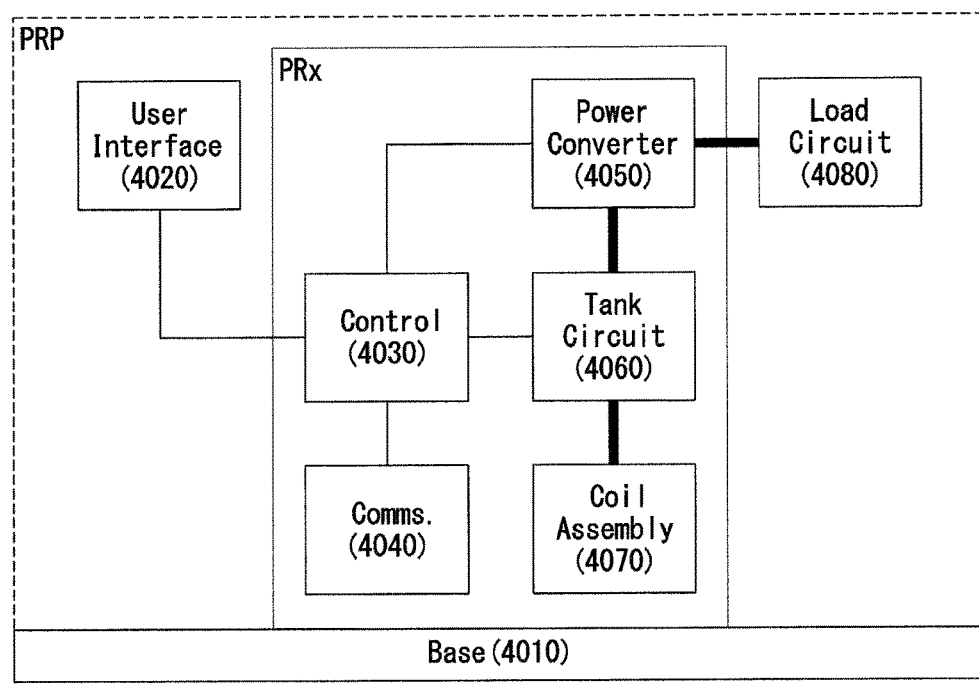
FIG. 4 is a block diagram of a power receiver product in accordance with an embodiment of the present invention.

FIG. 4 is a block diagram of a power receiver product in accordance with an embodiment of the present invention.

Referring to FIG. 4, the power receiver product PRP may include at least one of a user interface 4020 configured to provide information about the progress of power reception and other related information, a power receiver PRx configured to receive wireless power, a load circuit 4080, or a base 4010 configured to support or cover a coil assembly 4070. In particular, the user interface 4020 may be optionally included in the power receiver product PRP or may be included as another user interface of the power receiver product PRP.

The power receiver PRx may include at least one of a power converter 4050, a tank circuit (or impedance matching circuit) 4060, the coil assembly 4070, a communication unit 4040, or a control unit 4030.

The power converter 4050 may convert AC power, received from a secondary coil, into a voltage and current suitable for the load circuit 4080. The power converter 4050 may include a rectifier. The power converter 4050 may further adapt reflected impedance of the power receiver PRx.

The tank circuit 4060 may provide impedance matching between the secondary coil and a combination of the power converter 4050 and the load circuit 4080. In an embodiment, the tank circuit 4060 may generate resonance of about 100 kHz which may enhance power transfer.

The coil assembly 4070 includes at least one secondary coil and may further include an element for shielding the metal part of a receiver against a magnetic field.

The communication unit 4040 may perform load modulation in order to communicate a request and other information for the power transmitter PTx. To this end, the power receiver PRx may switch a resistor or capacitor on or off so that reflected impedance is changed.

The control unit 4030 may control reception (or received) power. To this end, the control unit 4030 may determine/calculate a difference between the actual operating point of the power receiver PRx and a required operating point. Furthermore, the control unit 4030 may control/reduce a difference an actual operating point and a required operating point by making a request to control reflected impedance and/or the operating point of the power transmitter PTx. If such a difference is minimized, power can be optimally received.

The elements of the power transmitter product PTP may be provided as separate units/elements/chipsets or may be provided as a single unit/element/chipset as shown in FIG. 1. For example, the communication unit and the control unit may be provided as separate elements/chipsets or may be provided as a single element/chipset as shown in FIG. 1. Furthermore, the elements of the power transmitted product PTP may be optionally included, or a new element(s) may be added the power transmitter product PTP.

In shared mode, the power transmitter PTx needs to manage an exchange of pieces of information with one or more power receivers. To this end, the power transmitter PTx provides a structure for communication with the power receiver PRx. The structure is described in detail later in connection with a communication frame structure of FIG. 5.

Figure 5:
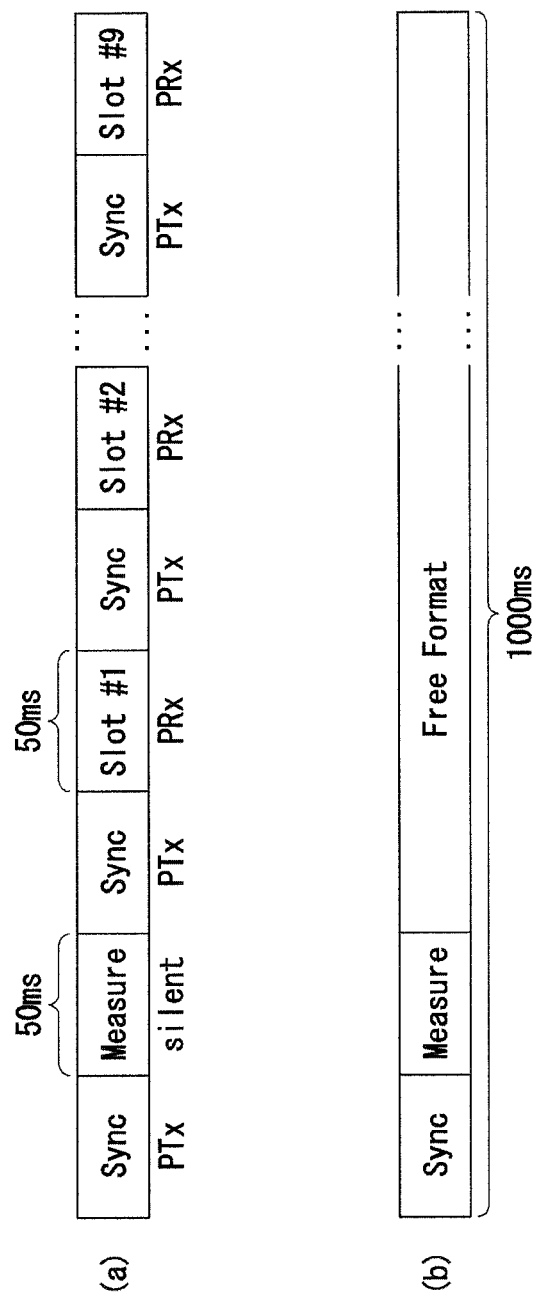
FIG. 5 is a diagram showing a frame structure for data communication in wireless charging.

FIG. 5 is a diagram showing a frame structure for data communication in wireless charging.

Referring to FIG. 5, the power transmitter provides a structure for providing a sequence of time slots in which respective power receivers may send data packets. A sync pattern is provided between the time slots. The sync pattern functions to separate the time slots and to optimize the communication of the power receivers. In particular, the sync pattern may provide information for a collision resolution and guaranteed latency to the power receiver.

A shared mode protocol may use two types of frames, that is, a slotted frame (refer to FIG. 5(a)) and a free format frame (refer to FIG. 5(b)). The slotted frame may be used for the power receiver to send a short data packet to the power transmitter. The free format frame may be used for the bidirectional transmission of large data packets and the selection of a coil in a multi-coil transmitter.

All the frames start with the sync pattern and a measurement slot. The measurement slot may be used to measure transmission power and reception power. In an embodiment, nine slots may be included in a single slotted frame. In the case of the free format frame, there is no limit to a specific format subsequent to the sync pattern and the measurement frame. The start bit (or information) of the sync pattern may be indicative of the start of the frame.

FIG. 6 is a diagram showing the format of the sync pattern in accordance with an embodiment of the present invention.

Referring to FIG. 6, the sync pattern may include at least one of a preamble, a start bit, a response field, a type field, an Info field, or a parity bit.

The preamble includes a sequence of bits set to "1." The number of included bits may be changed depending on an operating frequency.

The start bit may be set to "0 (ZERO)."

The parity bit is the last bit of the sync pattern. The parity bit may be set to 1 if the number of bits that are included in data fields included in the sync pattern and that are set to 1 is an even number and may be set to 0 in other cases (i.e., if the number of bits is an odd number).

The response field may include a response from the power transmitter with respect to communication using a preceding slot from the power receiver. "00" may indicate that communication has not been detected. "01" may indicate that a communication error has been detected. "10" may indicate non-acknowledge indicating that communication has not been correctly received. "11" may indicate acknowledge indicating that communication has been correctly received.

The type field may be set to "1" if a sync pattern included in the type field is a first sync pattern included in a corresponding frame. Furthermore, the type field may be set to "0" if a sync pattern included in the type field is not a first sync pattern included in a corresponding frame.

The Info field has a different value and meaning depending on a sync pattern appearing in the sync field (or the type field).

First, if the type field is "1", the Info field may indicate whether a corresponding frame is a slotted frame or a free format frame. If the Info field indicates that a corresponding frame is a slotted frame, the Info field may be set to "00." Furthermore, if the Info field indicates that a corresponding frame is a free format frame, the Info field may be set to "01."

Furthermore, if the type field is "0", the Info field may indicate whether a next slot is a slot allocated to a specific receiver, whether a next slot is a locked slot temporarily provided to a specific receiver, or whether a next slot is a free slot available for any receiver. If the Info field indicates that a next slot is a slot allocated to a specific receiver, the Info field may be set to "00." Furthermore, if the Info field indicates that a next slot is a locked slot temporarily provided to a specific receiver, the Info field may be set to "01." Furthermore, if the Info field indicates that a next slot is a free slot available for any receiver, the Info field may be set to "10."

Figure 7:
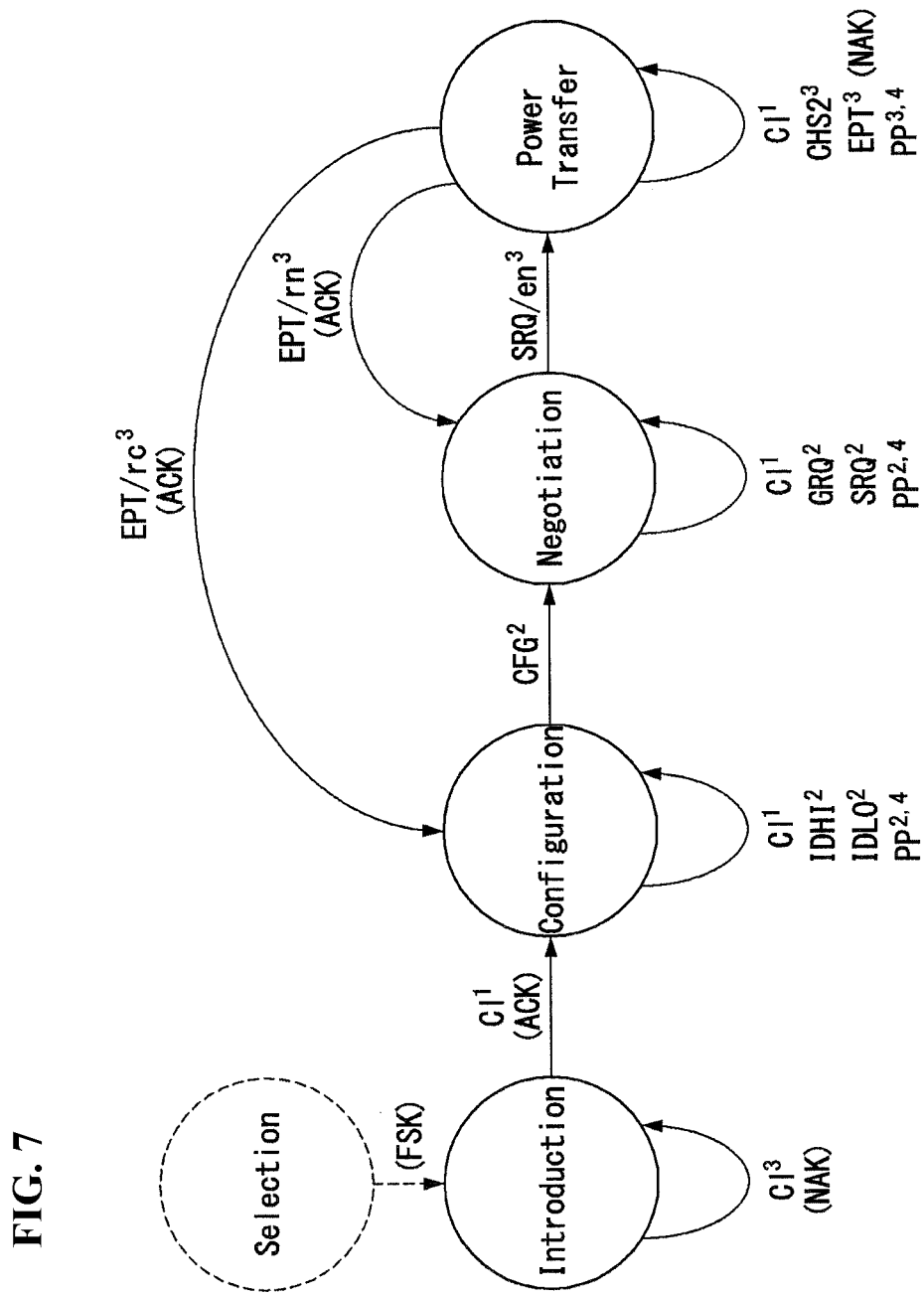
FIG. 7 shows the state diagram of a power receiver in shared mode.

FIG. 7 shows the state diagram of the power receiver in shared mode. Hereinafter, the power receiver is chiefly described, but a description regarding the state to be described later may be identically (or similarly) applied to the power transmitter.

In shared mode, the power receiver may be in a selection state, an introduction state, a configuration state, a negotiation state, or a power transfer state. The selection state may correspond to a selection phase, the introduction state may correspond to an introduction phase, the configuration state may correspond to a configuration phase, the negotiation status may correspond to a negotiation phase, and the power transfer state may correspond to a power transfer phase.

The selection phase corresponds to a selection phase in which in induction mode, the power transmitter monitors the contact/detachment of an object with respect to a surface of the interface included in the power transmitter. The selection phase in shared mode may be omitted. Accordingly, the power receiver may perform the remaining four phases. When detecting the presence of frequency shift keying (FSK) in a power signal prior to wake-up time-out, the power receiver may immediately perform the introduction phase after the selection phase.

In the introduction phase, the power receiver may request a free slot in which a control information (CI) packet to be used in next phases (e.g., the configuration phase, the negotiation phase, or the power transfer phase) will be transmitted. To this end, the power receiver sends an initial CI packet. If the power transmitter makes a response as ACK, the power receiver may enter the configuration phase. If the power transmitter makes a response as NACK, another power receiver may have performed the configuration phase or the negotiation phase. In this case, the power receiver may request a free slot from the power transmitter again. When the power receiver receives ACK from the power transmitter, the power receiver may determine the location of its own private slot in a frame and then send a CI packet using the slot at the determined location.

In the configuration phase, the power transmitter may provide a series of locked slots for the exclusive use of the power receiver. In this case, the power receiver may perform the configuration phase without a collision. The power receiver may send two identification data packets IDHI and IDLO, a version information packet VSN, and optionally at least one proprietary data packet and a configuration packet CFG using the locked slots. When the configuration phase is completed, the power receiver may enter the negotiation phase.

In the negotiation phase, the power transmitter may continue to supply locked slots for the exclusive use of the power receiver. In this case, the power receiver may perform the negotiation phase without a collision. The power receiver may send a negotiation data packet (including a specific request SRQ) and a general request (GRQ)) and/or at least one optional proprietary data packet using the locked slots. Furthermore, the power receiver may terminate the negotiation phase by sending an SRQ/end-negotiation (en) packet. When the negotiation phase is terminated, the power transmitter enters the power transfer phase, and the power transmitter stops the supply of locked slots.

In the power transfer phase, the power receiver sends a CI packet using a free slot determined in the introduction phase and receives power. The power receiver may include a regulator circuit. The regulator circuit may be included in the aforementioned communications & control unit. The power receiver may self-regulate reflected impedance of the power receiver through the regulator circuit. That is, the power receiver may regulate reflected impedance using the regulator circuit in order to transfer the amount of power necessary for an external load, to prevent excessive power from being received, or to prevent overheating. In shared mode, the power transmitter may not regulate transmission power in response to a received CI packet in operating mode. In this case, the power receiver may control the regulator circuit in order to prevent an over-voltage situation.

The power receiver may be supplied with power from the power transmitter and charged through the aforementioned phases. In particular, in shared mode, a single power transmitter may simultaneously provide power to a plurality of power receivers. In this case, the amount of power allocated (or provided) to each power receiver may be determined based on the number of power receivers that are being charged because a total amount of power which may be provided from the power transmitter to the plurality of power receivers is limited. Accordingly, the power transmitter may need to flexibly regulate the amount of power, provided to each power receiver, based on a change in the number of power receivers that are being charged.

For example, it may be assumed that two power receivers (hereinafter referred to as "5 W power receivers") each capable of receiving power of 5 W are placed in the charging area of a power transmitter capable of power transfer of up to 15 W and are being charged. In this case, each of the two 5 W power receivers may receive power of 5 W from the power transmitter. In this case, a new power receiver (hereinafter referred to as a "15 W power receiver") capable of receiving power of 15 W may be added to the charging area. Since the power transmitter is capable of power transfer of a maximum of 15 W, the new 15 W power receiver may be provided with only the remaining 5 W (=15 W−5 W−5 W) from the power transmitter.

In this case, if the charge status of the two 5 W power receivers is changed (e.g., if the 5 W power receivers deviate from the charging area or the charging of the 5 W power receivers has been completed), the power transmitter may allocate 10 W, allocated to the two power receivers, to the 15 W power receiver. That is, the power transmitter may need to newly negotiate with each power receiver with respect to the amount of power to be provided to each power receiver depending on a change in the number of power receivers that are being charged.

In this specification, a phase for returning to the negotiation phase depending on a change in the number of power receivers that are being charged as described above may be called a "renegotiation phase." The renegotiation phase may correspond to a renegotiation status.

The renegotiation phase of the power transmitter/receiver according to a change in the number of power receivers that are being charged is described in more detail below. In particular, the renegotiation phase of the power transmitter/receiver if 1) the number of power receivers that are being charged is reduced and 2) if the number of power receivers that are being charged is increased.

Figure 8:
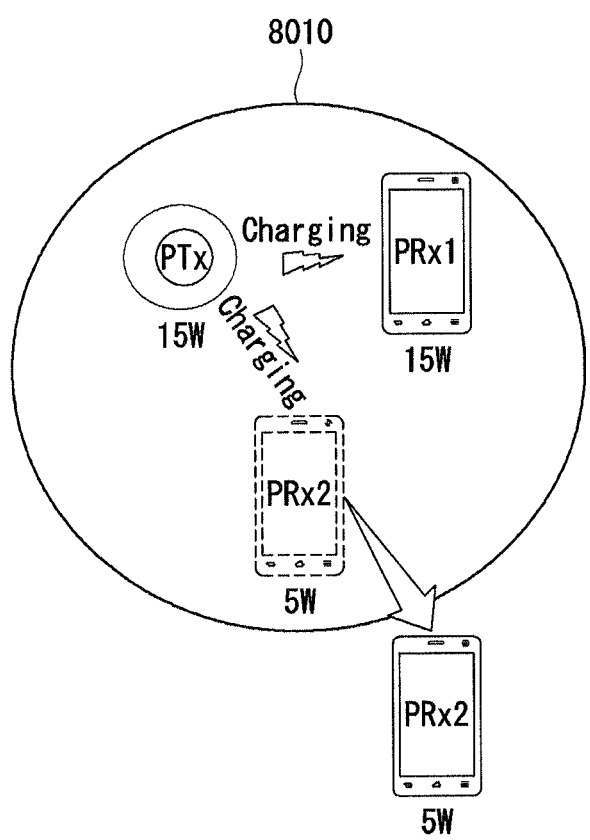
FIG. 8 a diagram regarding an embodiment if the number of power receivers that are being charged is reduced.

FIG. 8 a diagram regarding an embodiment if the number of power receivers that are being charged is reduced.

Referring to FIG. 8, a power receiver PRx placed in the charging area 8010 of a power transmitter PTx may be charged with power received from the power transmitter PTx.

For example, it may be assumed that a 15 W power receiver (hereinafter referred to as a "first power receiver") PRx1 and a 5 W power receiver (hereinafter referred to as a "second power receiver") PRx2 are placed in the charging area 8010 of the power transmitter PTx capable providing total power of 15 W and are being charged. In this case, the power transmitter PTx may divide the total power of 15 W and allocate the divided power to the first and the second power receivers PRx1 and PRx2 because it is capable of providing the power of 15 W. For example, the power transmitter PTx may provide power of 10 W to the first power receiver PRx1 and power of 5 W to the second power receiver PRx2.

In this case, the charge status of the second power receiver PRx2 may be changed. In this case, the "change of the charge status" may indicate various cases in which the power receiver PRx no longer receives power from the power transmitter PTx, such as that the charging of the power receiver PRx has been completed, that power of the power receiver PRx has been off, that a user has stopped the charging of the power receiver PRx, or that the power receiver PRx has deviated from the charging area 8010 of the power transmitter PTx. In some embodiments, such a change of the charge status of the power receiver PRx may be detected in various ways by the power transmitter PTx and/or the power receiver PRx. This is described in detail later with reference to FIG. 10.

When the power transmitter PTx detects a change of the charge status of the second power receiver PRx2, it may enter a renegotiation phase in which the power transmitter enters a negotiation phase in order to renegotiate the amount of power to be transmitted with the first power receiver PRx1. Such a renegotiation phase is described in more detail below with reference to FIGS. 9 to 14.

Figure 9:
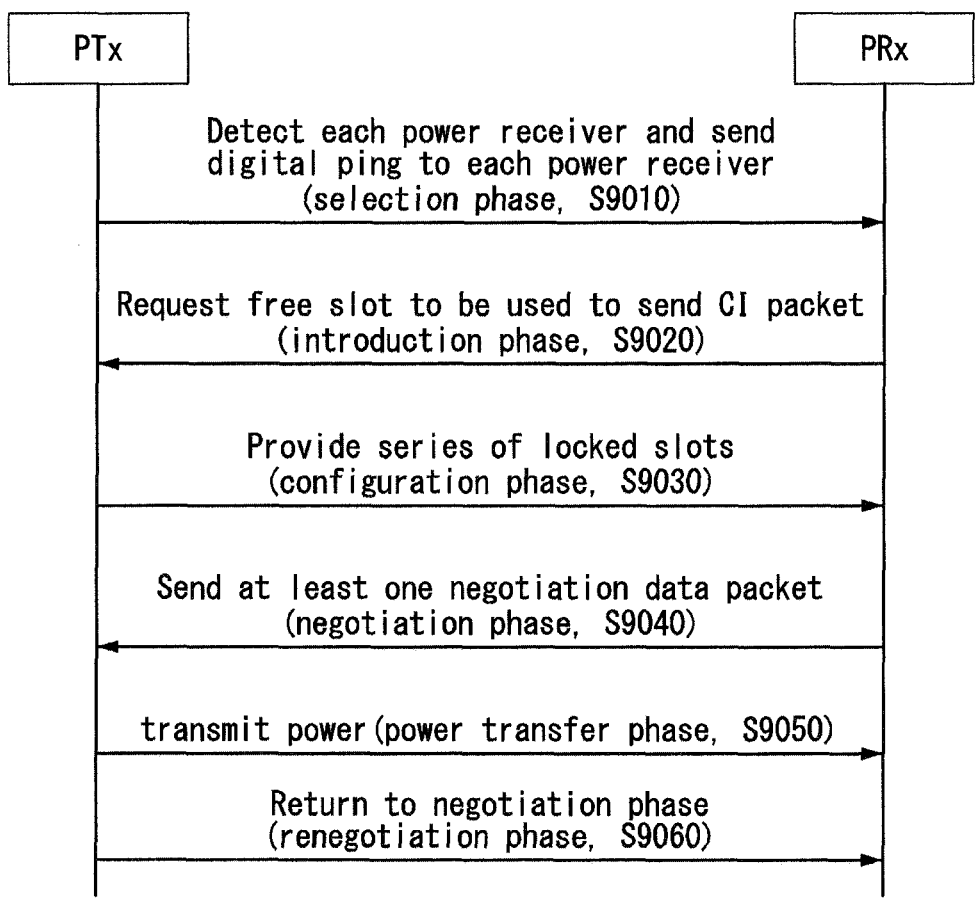
FIG. 9 is a flowchart illustrating a power transmitter/receiver in accordance with an embodiment of the present invention.

FIG. 9 is a flowchart illustrating a power transmitter/receiver in accordance with an embodiment of the present invention. The description of FIG. 7 is identically applied to phases described in relation to the flowchart of FIG. 9, and a redundant description is omitted. Furthermore, each of the phases shown in the flowchart of FIG. 9 may be optionally included, and a new phase(s) may be added to the flowchart of FIG. 9.

Referring to FIG. 9, first, a power transmitter PTx may perform a selection phase for detecting at least one power receiver PRx and sending a digital ping to each power receiver PRx (S9010). For example, the power transmitter PTx may detect first and second power receivers PRx and send digital pings to the first and the second power receivers PRx, respectively.

Next, the power receiver PRx may perform an introduction phase for requesting a free slot to be used to send a CI packet from the power transmitter PTx (S9020). For example, each of the first and the second power receivers PRx may request a free slot to the power transmitter PTx, and the free slot is used to send a CI packet to the power transmitter PTx.

Next, the power transmitter PTx may perform a configuration phase for providing a series of locked slots to the power receiver PRx (S9030). For example, the power transmitter PTx may provide a series of locked slots to each of the first and the second power receivers PRx.

Next, the power receiver PRx may perform a negotiation phase for sending at least one negotiation data packet to the power transmitter PTx (S9040). For example, each of the first and the second power receivers PRx may send at least one negotiation data packet to the power transmitter PTx. In this case, each of the first and the second power receivers PRx may send at least one negotiation data packet to the power transmitter PTx using the series of locked slots provided in the configuration phase.

Next, the power transmitter PTx my send power to the power receiver PRx (S9050). More specifically, the power transmitter PTx may send power to the power receiver PRx based on a result of a negotiation in the negotiation phase. For example, the power transmitter PTx may send power to each of the first and the second power receivers PRx based on a result of a negotiation with each of the first and the second power receivers PRx in the negotiation phase.

Next, the power transmitter PTx and receiver PRx may perform a renegotiation phase for returning to the negotiation phase (S9060). More specifically, when detecting a change of the charge status of at least one power receiver PRx that is being charged as described above with reference to FIG. 8, the power transmitter PTx may perform the renegotiation phase S9060 for returning to the negotiation phase S9040. For example, the power transmitter PTx may detect a change in the charge status of the second power receiver while sending power to the first and the second power receivers PRx. In this case, the power transmitter PTx may return to the negotiation phase S9040 (or perform the renegotiation phase S9060) in order to renegotiate the amount of transmission power with the first power receiver. Furthermore, the power transmitter PTx may return to the negotiation phase S9040 (or perform the renegotiation phase S9060) with the first power receiver by notifying the first power receiver that a renegotiation is possible.

Such a renegotiation phase S9060 of the power transmitter PTx and receiver PRx are described in detail below with reference to FIGS. 10 to 12.

Figure 10:
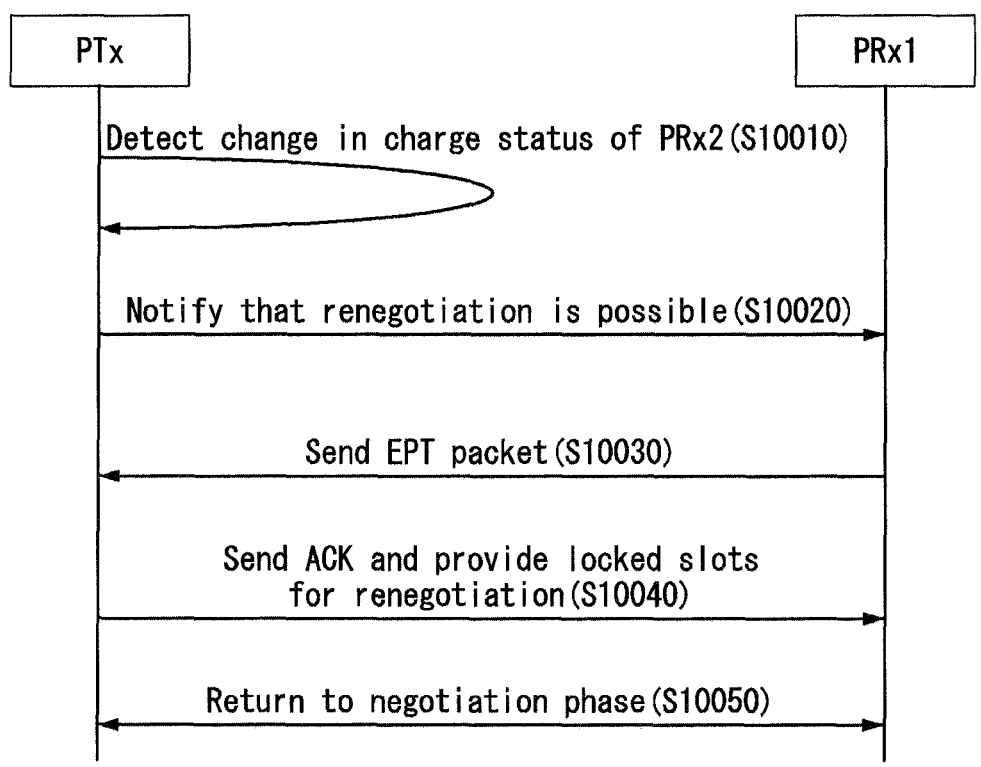
FIG. 10 is a flowchart illustrating an operating method of the power transmitter/receiver which perform a renegotiation phase in accordance with an embodiment of the present invention.

FIG. 10 is a flowchart illustrating an operating method of the power transmitter/receiver which perform a renegotiation phase in accordance with an embodiment of the present invention. Each of phases shown in the flowchart of FIG. 10 may be optimally included, and a new phase(s) may be added to the flowchart.

Referring to FIG. 10, first, a power transmitter PTx may detect a change in the charge status of a power receiver PRx2 that is being charged (S10010). More specifically, the power transmitter PTx may detect a change in the charge status of at least one power receiver PRx2 that is being charged. For example, the power transmitter PTx may detect a change in the charge status of the second power receiver PRx2 attributable to the deviation of the second power receiver PRx2 from the charging area while charging first and second power receivers PRx2 and PRx2. In this case, in various embodiments, the power transmitter PTx may detect the change in the charge status of the second power receiver PRx2.

In an embodiment, the power transmitter PTx may detect a change in the charge status of the second power receiver PRx2 by receiving an end power transfer (EPT) packet from the second power receiver PRx2. In this case, the EPT packet may include information about a slot number allocated to the second power receiver PRx2 and EPT code information indicative of the charge completion of the second power receiver PRx2. Alternatively, the EPT packet may include information about a slot number allocated to the second power receiver PRx2 and EPT code information that instructs the power transmitter PTx to return to a negotiation phase.

In another embodiment, if the power transmitter PTx does not consecutively receive a CI packet from the second power receiver PRx2, it may detect a change in the charge status of the second power receiver PRx2. While receiving power, the second power receiver PRx2 performs communication with the power transmitter PTx by continuing to send the CI packet to the power transmitter PTx using an allocated free slot. Accordingly, if the power transmitter PTx does not continue to receive a CI packet from the second power receiver PRx2 (e.g., if a CI packet is not transmitted by the second power receiver PRx2 through two continuous free slots), the power transmitter PTx may detect a change in the charge status of the second power receiver PRx2. Alternatively, if the power transmitter PTx does not receive a CI packet from the second power receiver PRx2 for a predetermined time, the power transmitter PTx may detect a change in the charge status of the second power receiver PRx2.

Next, the power transmitter PTx may notify the power receiver PRx1 that a renegotiation is possible (S10020). More specifically, the power transmitter PTx may notify the remaining power receivers PRx1 other than the power receiver PRx2 whose charge status has been changed that a renegotiation regarding the amount of transmission power is possible. For example, when detecting a change in the charge status of the second power receiver PRx2, the power transmitter PTx may notify the first power receiver PRx1 that a renegotiation regarding the amount of transmission power is possible. In this case, the power transmitter PTx may notify the first power receiver PRx1 that the renegotiation is possible using a sync pattern. The sync pattern is described below with reference to FIG. 11.

Figure 11:
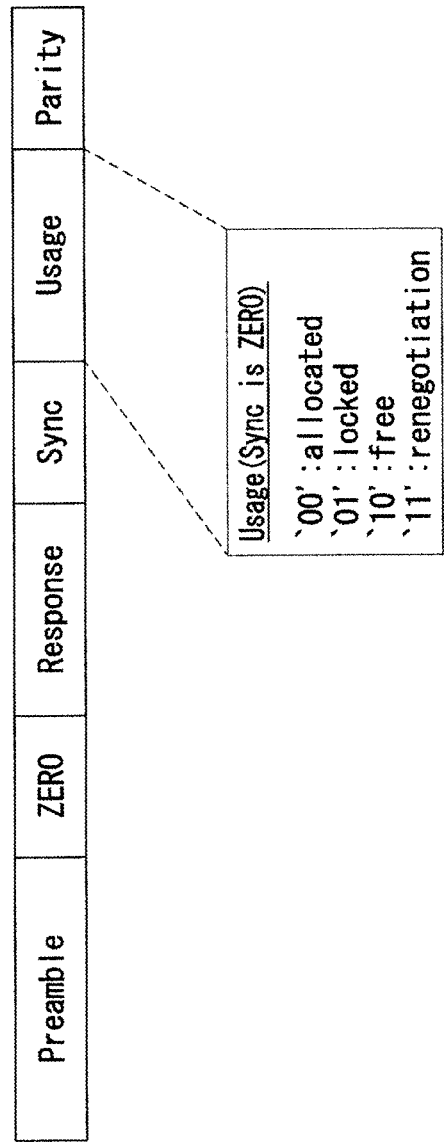
FIG. 11 is a diagram showing the format of a sync pattern in accordance with an embodiment of the present invention.

FIG. 11 is a diagram showing the format of the sync pattern in accordance with an embodiment of the present invention. The sync pattern has been described with reference to FIG. 6, and a redundant description thereof is omitted.

Referring to FIG. 11, the power transmitter PTx may notify the first power receiver PRx1 that the renegotiation is possible by sending the sync pattern, including renegotiation notification information, to the first power receiver PRx1. In this case, the renegotiation notification information may be included in the Info field (or called a usage field) of the sync pattern. In the case where the Info field (or a type field (or a sync field) is "0", "11" defined as reserved bits may be set as new bits for renegotiation notification information. For example, the type field of a sync pattern is "0" and the Info field of the sync pattern is "11", the sync pattern may indicate that the power transmitter PTx is capable of a renegotiation.

Referring back to FIG. 10, the power receiver PRx1 may send an EPT packet to the power transmitter PTx (S10030). In this case, the power receiver PRx1 may send the EPT packet to the power transmitter PTx using a free slot in order to notify the power transmitter PTx of the entry into the renegotiation phase. For example, in order to notify the power transmitter PTx of the entry into the renegotiation phase, the first power receiver PRx1 may send the EPT packet to the power transmitter PTx using the free slot. The format of the EPT packet is described in detail with reference to FIG. 12.

FIG. 12 is a diagram showing the EPT packet in accordance with an embodiment of the present invention.

Referring to FIG. 12, the EPT packet transmitted in order to enter the renegotiation phase may include EPT code (4 bits) indicting that a reason for requesting the stop of power transfer is a renegotiation and information (4 bits) about a slot number allocated to the power receiver PRx1. In this case, the EPT code indicative of the renegotiation reason is represented by "0x09" and may be included in the EPT packet and transmitted. A power transmitter which has received a corresponding EPT packet may stop power transfer.

Referring back to FIG. 10, the power transmitter PTx may send acknowledgement (ACK) to the power receiver PRx1 (S10040). More specifically, if the EPT packet is normally received without a collision against other packets, the power transmitter PTx may send ACK as a response to the received EPT packet. In this case, the power transmitter PTx may send ACK using the sync pattern. Furthermore, the power transmitter PTx may provide the power receiver PRx1 with a series of locked slots to be used for a renegotiation (S10040).

Next, the power transmitter/receiver may return to a negotiation phase and perform a negotiation for power transfer (S10050). In this case, the power receiver PRx1 may send a negotiation data packet (including a specific request (SRQ) and a general request (GRQ)) and/or at least one optional proprietary data packet using the series of locked slots, received in the previous phase (S10040), according to an MP protocol. The negotiation data packet is described in detail based on an SRQ packet with reference to FIG. 13.

FIG. 13 is a diagram showing the format of the SRQ packet in accordance with an embodiment of the present invention.

Referring to FIG. 13(a), the SRQ packet may include a request field (8 bits) and a power class & level field (or a request value field) (8 bits). The request field includes contents (or a request reason) that is requested by the power receiver PRx1 from the power transmitter PTx. The power class & level field includes parameter data regarding a request for the request field.

For example, if the request field is "0x01", it may mean that the power receiver PRx1 requests "guaranteed power" from the power transmitter PTx. In this case, the guaranteed power is indicative of a minimum amount of power that is requested by the power receiver PRx1 from the power transmitter PTx. In this case, detailed information about the "guaranteed power value" requested by the power receiver PRx1 may be included in the power class & level field.

Referring to FIG. 13(b), if the request field is "0x01" (i.e., if the power receiver PRx1 requests guaranteed power from the power transmitter PTx), the power class & level field may include a guaranteed power class field and a guaranteed power field (or a guaranteed power value field).

The power class field (2 bits) is a reserved field, and the bit value of the power class field may be set to "0."

The guaranteed power field (6 bits) includes information about a minimum amount of power requested by the power receiver PRx1 from the power transmitter PTx, that is, information about a guaranteed power value. In this case, the guaranteed power value may be included in the guaranteed power field in unit of 0.5 W.

Accordingly, when the power transmitter PTx receives the SRQ packet having the request field of "0x01", the power transmitter PTx determines the amount of power to be transmitted to the power receiver PRx1 in a power transfer phase using information about the guaranteed power value of the power class & level field included in the SRQ packet.

In another embodiment, the guaranteed power class field and the guaranteed power field may be included in a GRQ packet and transmitted from a power receiver to a power transmitter.

The operation of a power transmitter/receiver which perform a renegotiation phase if the number of power receivers that are being charged is reduced has been described in detail above. Hereinafter, the operation of a power transmitter/receiver which perform a renegotiation phase if the number of power receivers that are being charged is increased is described in detail.

Figure 14:
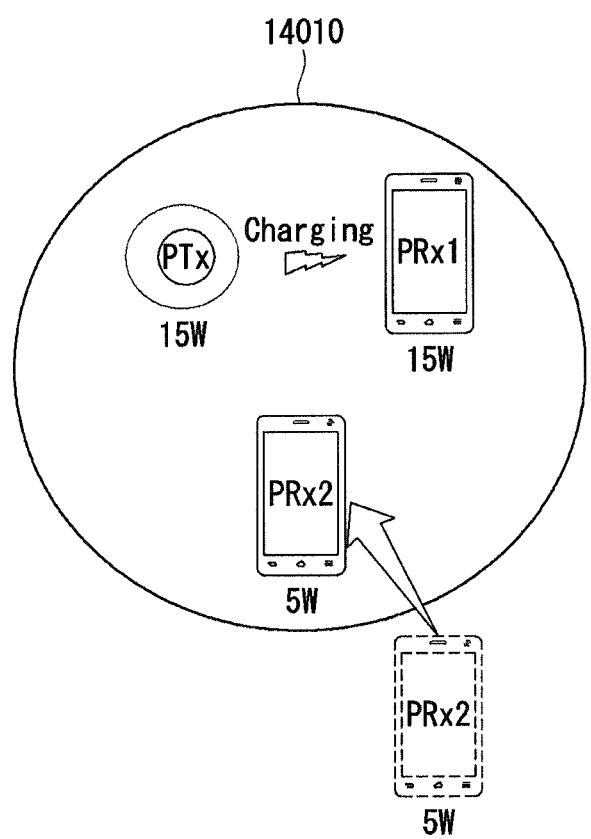
FIG. 14 is a diagram regarding an embodiment if the number of power receivers that are being charged is increased.

FIG. 14 is a diagram regarding an embodiment if the number of power receivers that are being charged is increased.

Referring to FIG. 14, power receivers PRx placed in the charging area of a power transmitter PTx may be charged with power received from the power transmitter PTx. For example, it may be assumed that a 15 W power receiver (hereinafter referred to as a "first power receiver") PRx1 is placed in the charging area 14010 of a power transmitter PTx capable of providing total power of 15 W and is charged. The power transmitter PTx is capable of providing total power of 15 W, and the first power receiver PRx1 is capable of being supplied with maximum power of 15 W. Accordingly, in order to improve charging efficiency and charging speed, the power transmitter PTx may allocate to the entire 15 W power to the first power receiver PRx1.

In this case, a 5 W power receiver (hereinafter referred to as a "second power receiver") PRx2 may newly enter the charging area of the power transmitter PTx. It is assumed that the new second power receiver PRx2 is required to be charged. In this case, the power transmitter PTx may negotiate power to be transmitted with the second power receiver PRx2 by performing the phases described with reference to FIG. V. In this case, the power transmitter PTx needs to renegotiate power to be transmitted to the first power receiver PRx1 because the power transmitter PTx has allocated and transmitted the entire power to the first power receiver PRx1. Accordingly, the power transmitter PTx may enter a renegotiation phase along with the first power receiver PRx1 and return to a negotiation phase. In this case, the contents described with reference to FIG. 10 may be identically applied to a detailed description of the renegotiation phase. In this case, in the present embodiment, the phase S10010 of FIG. 10 may be replaced with a phase for detecting the power receiver PRx2.

The power transmitter PTx may determine power to be allocated to each of the first and the second power receivers PRx1 and PRx2 by negotiating power with the new second power receiver PRx2 and the first power receiver PRx1 which has returned to the negotiation phase. In the present embodiment, the power transmitter PTx may allocate and send 10 W of 15 W to the first power receiver PRx1 and may allocate and send 5 W of 15 W to the second power receiver PRx2. The power transmitter PTx may simultaneously charge the first and the second power receivers PRx1 and PRx2 by sending the amount of power negotiated with each of the power receivers PRx1 and PRx2.

Various embodiments have been described in the best form for implementing the embodiments of the present invention.

An embodiment of the present invention may be applied to various wireless charging technologies.

In accordance with an embodiment of the present invention, there is an advantage in that charging efficiency and charging speed are improved because charging power is flexibly allocated to remaining power receivers depending on a reduction of the number of power receivers that are being charged.

In accordance with another embodiment of the present invention, there are advantages in that charging efficiency is improved and shared mode in which power is simultaneously provided to a plurality of power receivers is supported because power allocated to each power receiver is flexibly controlled depending on an increase in the number of power receivers that are being charged.

In addition, various effects in accordance with an embodiment of the present invention have been described above.

Furthermore, the drawings have been divided and described for convenience of description, but the embodiments described with reference to the drawings may be merged and designed to implement new embodiments.

Furthermore, the display device is not limited and applied to the configurations and methods of the aforemtioned embodiments, but some or all of the embodiments may be selectively combined and configured so that the embodiments are modified in various ways.

Furthermore, although some embodiments of this specification have been illustrated and described, this specification is not limited to the aforementioned specific embodiments and may be modified in various ways by those skilled in the art to which this specification pertains without departing from the gist of this specification claimed in the claims. The modified embodiments should not be individually interpreted from the technical spirit or prospect of this specification.

What is claimed is:

1. A method of wireless power transfer, by a power transmitter transmitting power to a plurality of power receivers, the method comprising:
   a selection phase for detecting each of the plurality of power receivers and sending a digital ping to each of the plurality of power receivers;
   an introduction phase for receiving a request from each of the plurality of power receivers for a free slot to send a control information (CI) packet,
   wherein each of the plurality of power receivers is allocated free slots at a specific location,
   wherein free slots allocated to different power receivers do not overlap with each other;
   a configuration phase for providing a series of locked slots to each of the plurality of power receivers;
   a negotiation phase for receiving at least one negotiation data packet from each of the plurality of power receivers using the series of locked slots provided to each of the plurality of power receivers;
   a power transfer phase for transmitting power to each of the plurality of power receivers; and
   a renegotiation phase for returning to the negotiation phase,
   wherein the renegotiation phase includes a phase for detecting a change of a charge status of a specific power receiver among the plurality of power receivers when any CI packet is not consecutively received during a predetermined number of free slots allocated to the specific power receiver.

2. The method of claim 1, wherein a case where the change of the charge status of the specific power receiver is detected includes:
   a case where a charge completion of the specific power receiver is detected, or
   a case where a deviation of the specific power receiver from a charging area is detected.

3. The method of claim 1, wherein the renegotiation phase further includes detecting the change of the charge status by receiving an end power transfer (EPT) packet from at least one power receiver among the plurality of power receivers.

4. The method of claim 3, wherein the EPT packet includes:
   information on a slot number allocated to the at least one power receiver, and
   EPT code information indicating a charge completion of the at least one power receiver.

5. The method of claim 1, wherein, when the change of the charge status of the at least one power receiver is detected, the renegotiation phase further includes a phase for notifying the plurality of power receivers, other than the specific power receiver, of a return to the negotiation phase.

6. The method of claim 5, wherein the phase for notifying the plurality of power receivers, other than the specific power receiver, of the return to the negotiation phase includes sending a sync pattern including renegotiation information indicating the return to the negotiation phase to the plurality of power receivers other than the specific power receiver.

7. The method of claim 6, wherein the renegotiation information is included in an Info field of the sync pattern.

8. The method of claim 6, further comprising a phase for receiving an end power transfer (EPT) packet from the plurality power receivers, other than the specific power receiver, as a response to the sync pattern.

9. The method of claim 8, wherein the EPT packet includes:
    information on slot numbers allocated to the plurality of power receivers other than the specific power receiver, and
    an EPT code indicating the return to the negotiation phase.

10. A power transmitter transmitting power to a plurality of power receivers, comprising:
    a coil assembly comprising at least one primary coil configured to generate a magnetic field;
    an inverter configured to convert a Direct Current (DC) signal into an Alternating Current (AC) signal;
    a tank circuit configured to provide impedance matching between the inverter and the at least one primary coil;
    a communication unit configured to provide communication with a power receiver; and
    a control unit configured to control power transfer,
    wherein the power transmitter is configured to:
    detect each of the plurality of power receivers and send a digital ping to each of the plurality power receivers,
    receive a request from each of plurality of power receivers for a free slot to send a control information (CI packet),
    wherein each of the plurality of power receivers is allocated free slots at a specific location,
    wherein free slots allocated to different power receivers do not overlap with each other,
    provide a series of locked slots to each of plurality of power receivers,
    receive at least one negotiation data packet from each of the plurality of power receivers using the series of locked slots provided to each of the plurality of power receivers, and
    transmit power to each of the plurality of power receivers,
    detect a change of a charge status of a specific power receiver among, the plurality of power receivers when any CI packet is not consecutively received during a predetermined number of free slots allocated to the specific power receiver, and
    return to the negotiation phase.

11. The power transmitter of claim 10, wherein a case where the change of the charge status of the specific power receiver is detected includes:
    a case where a charge completion of the specific power receiver is detected, or
    a case where a deviation of the specific power receiver from a charging area is detected.

12. The power transmitter of claim 10, wherein the power transmitter is further configured to detect the change of the charge status by receiving an end power transfer (EPT) packet from at least one power receiver among the plurality of power receivers.

13. The power transmitter of claim 12, wherein the EPT packet includes:
    information on a slot number allocated to the at least one power receiver, and
    EPT code information indicating a charge completion of the at least one power receiver.

14. The power transmitter of claim 10, wherein, when the change of the charge status of the at least one power receiver is detected, the power transmitter is further configured to notify the plurality of power receivers, other than the specific power receiver, of a return to a negotiation phase.

15. The power transmitter of claim 14, wherein the power transmitter is further configured to send a sync pattern including renegotiation information indicating the return to the negotiation phase to the plurality of power receivers other than the specific power receiver.

16. The power transmitter of claim 15, wherein the renegotiation information is included in an info field of the sync pattern.

17. The power transmitter of claim 15, wherein the power transmitter is further configured to receive an end power transfer (EPT) packet from the plurality of power receivers, other than the specific power receiver, as a response to the sync pattern.

18. The power transmitter of claim 17, wherein the EPT packet includes:
    information on slot numbers allocated to the plurality of power receivers other than the specific power receiver, and
    an EPT code indicating the return to the negotiation phase.

* * * * *